United States Patent Office 3,029,266
Patented Apr. 10, 1962

3,029,266
ORGANOMETALLIC COMPOUNDS
Rex D. Closson, Northville, and Thomas H. Coffield, Farmington, Mich., assignors to Ethyl Corporation, New York, N.Y., a corporation of Delaware
No Drawing. Filed Mar. 26, 1959, Ser. No. 801,996
19 Claims. (Cl. 260—429)

This invention relates to novel organometallic compounds and more specifically, to acyl manganese carbonyl compounds wherein manganese is bonded to an organic residue and a plurality of carbonyl coordinating groups. This application is a continuation-in-part of our prior copending application Ser. No. 645,675 filed March 13, 1957, and now abandoned.

It is an object of this invention to provide a novel class of acyl manganese compounds. Another object is to provide a class of acyl manganese carbonyl compounds. A further object is to provide a process for the preparation of acyl manganese carbonyl compounds. Other objects of this invention will become apparent by reading the following detailed description of the instant invention.

The objects of this invention are accomplished by providing an acyl manganese pentacarbonyl compound. Such a compound is conveniently represented by the formula $R(CO)Mn(CO)_5$ where "R" is a univalent group. "R" preferably has from one to about 17 carbon atoms such that the compound has a molecular weight between about 210 and about 450. Further, it is a member of the group consisting of alkyl, aryl, aralkyl, alkaryl and alicyclic groups. "R" may contain other substituents and may contain one or more double and triple bonds.

Typical substituents which may be present in the "R" group are alkyl, halogen, alkoxy, aryloxy, carbethoxy, carbamide, thioether, nitro, nitroso and hydroxy groups.

Examples of novel compounds of our invention are benzoyl manganese pentacarbonyl, acetyl manganese pentacarbonyl, propionyl manganese pentacarbonyl, stearoyl manganese pentacarbonyl, perfluoroacetyl manganese pentacarbonyl, phenylacetyl manganese pentacarbonyl, acrylyl manganese pentacarbonyl, p-chlorobenzoyl manganese pentacarbonyl, p-phenoxyphenylacetyl manganese pentacarbonyl, B-methoxycaproyl manganese pentacarbonyl, 2-pentyne-1-carboxoyl manganese pentacarbonyl, 4-(p-iodo-phenoxy) phenyl caproyl manganese pentacarbonyl, 4-ureidobutyroyl manganese pentacarbonyl, 2,4,6-trifluorophenylpropionyl manganese pentacarbonyl, perbromoacetyl manganese pentacarbonyl, p-nitrosobenzoyl manganese pentacarbonyl, 4-(2-naphthylthio) butyroyl manganese pentacarbonyl, 4-hydroxyphenylacetyl manganese pentacarbonyl, 4-tert-butylphenylacetyl manganese pentacarbonyl, B-oxo-cyclohexylpropionyl manganese pentacarbonyl, cyclopentylacetyl manganese pentacarbonyl, cyclohexoyl manganese pentacarbonyl, 1-(1,3-cyclopentadienyl) propionyl manganese pentacarbonyl and the like.

Although our invention is directed to compounds of manganese, it is to be understood the metals technetium and rhenium are equivalent to manganese for the purposes of our invention. Thus, like compounds of technetium and rhenium may be formed using the methods of our invention as applied to manganese.

The acyl manganese pentacarbonyl compounds of our invention may be prepared by a novel process which comprises treating an alkali metal manganese pentacarbonyl compound with an organic acylating agent which reacts with the alkali metal manganese pentacarbonyl compound to form an acyl manganese pentacarbonyl compound. In this reaction, the alkali metal of the alkali metal manganese pentacarbonyl is replaced with an acyl group. A side product of the reaction is an alkali metal salt.

The acylating agents used in our process can be acyl halides such as alkylcarbonyl halides, arylcarbonyl halides, aralkylcarbonyl halides, and alkarylcarbonyl halides. These compounds have the general formula RCOX. "R" has the same meaning as set forth in the prior portion of this specification, and "X" is selected from the group consisting of fluorine, chlorine, bromine and iodine. Preferred acyl halides for use in our process are those in which "R" contains only single and double carbon-to-carbon bonds and does not contain triple bonds between carbon atoms. The preferred acyl halides react readily with alkali metal manganese pentacarbonyls to give high yields of acyl manganese pentacarbonyls.

Typical acyl halides which can be used in our process are propenoyl chloride, p-iodobenzoyl bromide, p-phenoxyphenylacetyl iodide, p-nitrosobenzoyl bromide, propionyl bromide, stearoyl chloride and the like.

Certain acid anhydrides also react with alkali metal manganese pentacarbonyl compounds to form acyl manganese pentacarbonyl compounds. This, trifluoro acetic acid anhydride reacts readily with an alkali metal manganese pentacarbonyl to form trifluoroacetyl manganese pentacarbonyl.

Other acylating agents may be used in preparing our novel compounds. For example, dibenzylacetyl phosphate, triacetyl phosphate and other acyl phosphates and phosphites may be used as acylating agents in preparing our novel compounds.

The alkali metal manganese pentacarbonyl intermediate is prepared by the reaction of an alkali metal with manganese carbonyl using an ether as a solvent. The alkali metal is conveniently reacted as a dispersion in an inert carrier or as an amalgam. The amalgam is preferred as its use ordinarily gives an easily conductible reaction and a higher yield of alkali metal manganese pentacarbonyl. The alkali metals include lithium, sodium, potassium, rubidium, cesium and francium. Of these lithium, sodium and potassium are most applicable to the preparation of an alkali metal manganese pentacarbonyl. Sodium is particularly preferred as it is a readily available material and its use leads to ultimately high yields of acyl manganese pentacarbonyl compounds. These alkali metal manganese pentacarbonyl intermediates are more fully disclosed in a previously filed patent application by Thomas H. Coffield entitled, "Synthesis of Metal Carbonyls" (U.S. patent application Serial No. 645,674 filed March 13, 1957, now U.S. Patent 2,967,087 granted January 3, 1961.

The reaction between an alkali metal manganese pentacarbonyl and the organic acylating agent to produce an acyl manganese pentacarbonyl is also conveniently conducted in an ether medium and thus the alkali metal manganese pentacarbonyl intermediate may be used without isolation. It has been found that high yields of acyl manganese pentacarbonyl compounds are obtained when the ether solvent has a boiling point in excess of 25° C. The cyclic ethers have been found to give excellent yields of organo manganese pentacarbonyl compounds and constitute a preferred class of solvents in the practice of this invention. Thus, such ethers as tetrahydrofuran and dioxane are preferred solvents as their use leads to excellent yields of the acyl manganese pentacarbonyl compounds of this invention.

The reaction to produce an acyl manganese pentacarbonyl compound is carried out at temperatures of from about 20° C. to about 100° C., the upper limit being dependent on the boiling point of the ether solvent. The choice of temperature conditions is dependent somewhat on the nature of the reactants, and often the reaction takes place at room temperature simply upon mixing of the reactants. However, when less reactive high molecular weight organo acylating agents are employed as reactants, it is convenient to conduct the reaction at a high temperature up to the reflux temperature of the solvent ether.

As pointed out, the reaction is often instantaneous upon mixing the ingredients but in order to insure a maximum yield of acyl manganese pentacarbonyl compound, it is often convenient to allow the reaction to continue for up to about one hour. Reaction times of longer duration are employed but are not ordinarily necessary. The time of reaction is dependent upon the activity of the reactants and the temperature employed.

The following examples are illustrative of the above described method to produce the novel acyl manganese pentacarbonyl compounds of our invention. In these examples, all parts and percentages are by weight unless otherwise indicated.

*Example I*

The sodium salt of 12 parts of manganese carbonyl $Mn_2(CO)_{10}$ was prepared in 133 parts of tetrahydrofuran by reacting it with 200 parts of one percent sodium amalgam. The clear amber solution was decanted and to it added 9.0 parts of benzoyl chloride. A red color developed and sodium chloride was precipitated. After one-half hour the solution was poured into ice water and the yellow solid which formed was filtered off and pressed dry to give 16.5 parts of benzoyl adduct, M.P. 88–91° (dec.). A small portion of this material crystallized from 1:3 benzene-petroleum ether mixture gave pale yellow plates, M.P. 95–96° with evolution of a gas. The infrared spectrum and elemental analysis support a benzoyl manganese pentacarbonyl structure and the formula $C_6H_5COMn(CO)_5$. Found on analysis: C, 48.2 percent; H, 2.03 percent; Mn, 18.3 percent.

The use of similar acylating agents such as 1-naphthyl acetyl bromide, p-methoxybenzoyl chloride and 2,4,6-trichlorobenzoyl chloride in the above process gives respectively 1-naphthyl acetyl manganese pentacarbonyl, p-methoxybenzoyl manganese pentacarbonyl and 2,4,6-trichlorobenzoyl manganese pentacarbonyl.

*Example II*

The procedure of Example I was followed in reacting the sodium salt of 4.1 parts of manganese carbonyl with three parts of acetyl chloride to give 3.5 parts of a pale yellow solid melting between 43 and 48° C. This material was purified by successive sublimation to give 2.6 parts (a 51 percent yield) of pure acetyl manganese pentacarbonyl which melted at 54 to 56° C. Analysis of this compound showed that it contained 35.2 percent carbon, 1.28 percent hydrogen and 23.1 percent manganese. This corresponds very well with a calculated content of 35.32 percent carbon, 1.27 percent hydrogen and 23.17 percent manganese for the formula $CH_3COMn(CO)_5$.

*Example III*

Following the procedure of Example II the sodium salt of 12 parts of manganese carbonyl was reacted with 6.1 parts of propionyl chloride to give 7.5 parts of propionyl manganese pentacarbonyl. This product melted at 56 to 57° C. and contained 38.3 percent carbon, 2.2 percent hydrogen and 22.2 percent manganese.

*Example IV*

Isobutyryl manganese pentacarbonyl was produced from isobutyryl chloride and the sodium salt of manganese carbonyl in the same manner as described in Example I. Based on the manganese pentacarbonyl used there was obtained an 85 percent yield of the product melting at 58 to 60° C. and which contained 40.9 percent carbon, 2.66 percent hydrogen and 20.9 percent manganese.

*Example V*

A solution of potassium manganese pentacarbonyl in dioxane is prepared by the reaction of 20 parts of manganese carbonyl and 500 parts of a one percent potassium amalgam using 800 parts of dioxane as a solvent. Stearoyl chloride (38 parts) is added to the dioxane solution of potassium manganese pentacarbonyl and the resulting reaction mixture is agitated with gentle heating to about 85° C. for 15 minutes. The dioxane is then distilled at reduced pressure from the mixture, which upon further distillation, gives stearoyl manganese pentacarbonyl, which is a semi-solid, in good yield.

*Example VI*

A solution of 21.8 parts of sodium manganese pentacarbonyl was prepared by reacting 19.5 parts of manganese pentacarbonyl in 133 parts of anhydrous tetrahydrofuran with an excess of freshly prepared one percent sodium amalgam under nitrogen in a reaction vessel. This solution was then transferred under nitrogen into a reaction vessel equipped with a stirrer, dropping funnel, reflux condenser and nitrogen sweep. 31.5 parts of trifluoroacetic anhydride was slowly added to the stirring solution from the funnel. An exothermic reaction occurred and a color change from opaque green/brown to an almost transparent yellow took place. The solution was allowed to stir overnight at room temperature after which it was poured into ice water. A pale yellow solid separated, was filtered off, and pressed dry. This yellow material, when recrystallized from carbon tetrachloride, gave 21.5 parts (81.4 percent yield) of white, fluffy crystalline product, perfluoroacetyl manganese pentacarbonyl having a melting point of 56.5–57.5° C.

The use of similar acylating agents in the above reaction such as tribromoacetic anhydride, trichloroacetic anhydride, and triiodoacetic anhydride will produce respectively tribromoacetyl manganese pentacarbonyl, trichloroacetyl manganese pentacarbonyl and triiodoacetyl manganese pentacarbonyl.

*Example VII*

One and nine hundredths (1.09) parts of sodium manganese pentacarbonyl in 22 parts of tetrahydrofuran was treated under nitrogen with 1.08 parts of phenylacetyl chloride. After stirring for 15 minutes, the mixture was poured into 400 parts of ice-water. The yellow crystalline precipitate which formed immediately was filtered, then washed with 10 percent sodium carbonate solution to remove unreacted acid chloride. It was washed with water and dried under vacuum. There was obtained 1.37 parts (87.3 percent of theory) of phenylacetyl manganese pentacarbonyl which melted at 112–114°. Recrystallization from ether yielded colorless sparkling crystals, melting at 116–117° with evolution of gas. The infrared spectrum showed metallo-carbonyl absorption in the $5\mu$ region and a band at $6.1\mu$ indicating the presence of a ketonic carbonyl group.

*Anal.*—Calcd. for $C_{13}H_7MnO_6$: C, 49.7; H, 2.23; Mn, 17.5. Found: C, 49.8; H, 2.31; Mn, 17.5.

*Example VIII*

A solution of 6.0 parts manganese pentacarbonyl in 44.4 parts anhydrous tetrahydrofuran was reacted under nitrogen with 90 parts of a one percent sodium amalgam. The green sodium salt solution thus formed was transferred under nitrogen into a reaction vessel equipped with a dropping funnel, magnetic stirrer and nitrogen flush. An excess, 4.0 parts of freshly prepared acrylyl chloride in nine parts of tetrahydrofuran was added to the stirred solution and a color change from green to yellow occurred. After approximately 15 minutes stirring, the solution was poured into ice water. A yellow solid separated, was filtered off and dried. Rapid recrystallization from cold, low boiling petroleum ether gave 3.5 parts (47.0 percent yield) of acrylyl manganese pentacarbonyl as yellow crystals, M.P. 58–58.5° C. It was observed that acrylyl manganese pentacarbonyl will decompose if allowed to remain in petroleum ether solution for any length of time.

*Anal.*—Calcd. for $C_8H_3O_6Mn$: C, 38.5 percent; H, 1.2 percent; Mn, 22.0 percent. Found: C, 37.3 percent; H, 1.39 percent; Mn, 22.4 percent.

Other acylating agents such as 3-butenoyl chloride, cinnamoyl bromide, and 5-chloro-3-pentenoyl bromide may be substituted for the acrylyl chloride in the above process to give respectively 3-butenoyl manganese pentacarbonyl, cinnamoyl manganese pentacarbonyl and 5-chloro-3-pentenoyl manganese pentacarbonyl.

Good yields of manganese pentacarbonyl compounds are also obtained when the rubidium, cesium and francium salts of manganese carbonyl are employed as reactants in the same manner as illustrated in Examples I through VIII.

The ethers applicable to the process of this invention include the lower alkyl ethers, cyclic ethers, and ethers containing a plurality of C—O—C linkages. Those ethers which boil above 25° C. are most applicable. Examples of these include ethyl butyl ether, dibutyl ether, iso-butyl iso-propyl ether, methyl neo-pentyl ether, diethyl ether of diethylene glycol, $$C_2H_5OC_2H_4OC_2H_4OC_2H_5$$

the dibutyl ether of diethylene glycol, tetrahydrofuran, 1,4-dioxane, 1,3-dioxane, substituted dioxanes and the like. Generally, a saturated organic ether which is free of other reactive groups and which contains no active hydrogen is suitable. The ethers are free of olefinic unsaturation, and contain at least about four carbon atoms. Ethers having from four to about 12 carbon atoms are found to be most useful. As pointed out, however, the cyclic ethers, including tetrahydrofuran and dioxane, constitute a preferred type of ether.

The reaction between an alkali metal manganese petacarbonyl and a reactive organic acylating agent frequently takes place upon mixing of the alkali metal manganese pentacarbonyl solution and the reactive organic compound, and the reaction is complete in a very short time. It is, however, frequently desirable to allow the reaction to continue for as much as one hour or longer. This is particularly true where the product of the reaction is not a crystalline solid, as with a higher molecular weight alkali metal manganese pentacarbonyl or such unsaturated compounds as allyl manganese pentacarbonyl.

When the product of the reaction is a crystalline solid, it ordinarily is insoluble in water and thus upon dilution of the ether with water is conveniently separated from the reaction mixture by simple filtration and is further purified by sublimation or recrystallization. When the reaction product is a liquid, it is conveniently separated from the reaction mixture by fractional distillation.

The above described process has also been extended to the preparation of acyl iron carbonyl compounds. This extension is illustrated by the following example illustrating the preparation of cyclopentadienyl acetyl iron dicarbonyl.

*Example IX*

Eighteen parts of dicyclopentadienyl diiron tetracarbonyl was dissolved in 100 ml. tetrahydrofuran and the solution treated with 115 parts of five percent sodium amalgam under nitrogen. The clear red solution thus obtained was treated with 22.4 parts of acetyl chloride. A vigorous reaction took place. The mixture was stirred for about 30 minutes and then poured into ice-water. On standing a solid formed which was filtered and dried. It was then sublimed at 30° C. at one millimeter to give a total of 13.4 parts (60 percent of theory) of cyclopentadienyl acetyl iron dicarbonyl which is a yellow-brown crystalline product having a melting point of 56–58°. Its infrared spectrum supports the structure assumed, since it had C—H stretching at $3\mu$, metallo-carbonyl band at $5\mu$ and a narrow band at $6.1\mu$, indicating ketonic carbonyl present.

*Anal.*—Calcd. for $C_9H_8FeO_3$: C, 49.2; H, 3.64; Fe, 25.4. Found: C, 49.3; H, 3.71; Fe, 25.2.

The novel acyl manganese pentacarbonyl compounds of our invention may also be prepared by carbonylation of an alkyl-, aralkyl-, aryl manganese pentacarbonyl compound. These compounds are fully described in two of our co-pending applications which were filed concurrently with the present application. These applications are U.S. application Serial No. 801,999 filed March 26, 1959, and U.S. application Serial No. 801,997 filed March 26, 1959. In general, they can be described as having the formula $RMn(CO)_5$ where "R" has the same meaning as it does in the formula $RCOMn(CO)_5$ previously discussed in this application.

The carbonylation reaction involves contacting the compound $RMn(CO)_5$ with carbon monoxide under pressure. A reaction occurs and the compound $$RCOMn(CO)_5$$

is formed.

The carbonylation reaction is preferably conducted in an ether solvent as hereinbefore described. The carbon monoxide pressure is maintained between about 50 to about 2000 p.s.i.g. at temperatures ranging from about 20 to about 200° C.

The following examples illustrate the process for carbonylation of an alkyl-, aralkyl- or aryl manganese pentacarbonyl compound to form the corresponding acyl manganese pentacarbonyl compound. In these examples, all parts and percentages are by weight unless otherwise indicated.

*Example X*

Methyl manganese pentacarbonyl (20.5 parts) was dissolved in 530 parts of anhydrous diethyl ether and the resulting solution was charged to a pressure resistant vessel having heating and cooling means, temperature measuring means, a pressure measuring device, means for admitting and discharging gases and agitation means. The vessel was pressured to 500 p.s.i.g. with carbon monoxide and maintained at this pressure at room temperature with agitation for 48 hours. The vessel was then vented and discharged and the ether was evaporated leaving 17.5 parts of product. This material was sublimed to give a 55 percent yield of acetyl manganese pentacarbonyl having a melting point of from 56 to 58° C.

The above reaction applies with equal facility to 4-iodobutyl manganese pentacarbonyl, heptadecyl manganese pentacarbonyl, hexyn-5-yl-1 manganese pentacarbonyl, and methoxymethyl manganese pentacarbonyl to form respectively 4-iodo valeryl manganese pentacarbonyl, stearoyl manganese pentacarbonyl, hepten-7-oyl-1 manganese pentacarbonyl, and methoxyacetyl manganese pentacarbonyl.

*Example XI*

Benzyl manganese pentacarbonyl (4 parts) is dissolved in 60 parts of dibutyl ether and the solution is charged to a pressure resistant vessel. The vessel is pressured with carbon monoxide to 2000 p.s.i.g. and heated to 200° C. with agitation. The temperature and pressure are maintained for one hour and 30 minutes after which time the vessel is cooled, vented and the contents discharged. A good yield of phenyl acetyl manganese pentacarbonyl is recovered.

*Example XII*

The procedure in Example X is followed using a reaction temperature of 100° C. and a carbon monoxide pressure of 250 p.s.i.g. A good yield of acetyl manganese pentacarbonyl results.

*Example XIII*

The sodium salt made from 12.0 parts of manganese carbonyl in 111 parts of tetrahydrofuran was charged into an autoclave with 9.6 parts of ethyl iodide and was stirred at room temperature for four hours to yield ethyl manganese pentacarbonyl. Then 500 p.s.i.g. carbon monoxide pressure was applied and maintained for sixteen hours. After discharging the autoclave the mixture was poured into water. After an hour of stirring colorless crystals separated which were dried and weighed. Twelve parts or a 77 percent yield of crude propionyl manganese pentacarbonyl was obtained. Recrystallization from isooctane resulted in 8.0 parts of pure, almost colorless crystalline product (51.5 percent of the theory) with a melting point of 56–57° C. The infrared spectrum of this material proved identical to the propionyl manganese pentacarbonyl obtained by the method of Example III.

*Example XIV*

Ninety-six parts of phenyl manganese pentacarbonyl was dissolved in 713 parts of diethyl ether and pressured to 700 p.s.i.g. with carbon monoxide in an autoclave, having a glass liner and magnetic stirrer. This solution was stirred at room temperature for sixteen hours under pressure and the autoclave then discharged. A fairly ether soluble product was then revealed, in contrast with the very soluble starting material. Infrared curve taken from the sample of the isolated crystals showed strong ketonic carbonyl bond at 6.1μ, indicating that benzoyl manganese pentecarbonyl was formed. The solution was diluted until the product was all dissolved in ether, then it was slowly evaporated and cooled. Sparkling pale yellow crystals precipitated. These were filtered and dried in air. Ninety-two parts of crude benzoyl manganese pentacarbonyl were obtained. The product was identified by melting point (92–94° C.) and infrared analysis. The spectrum was completely identical to that of the material obtained from the reaction of benzoyl chloride and sodium manganese carbonyl in Example I.

When similar compounds such as p-phenoxyphenyl manganese pentacarbonyl, 2,4,5-trichlorophenoxymethyl manganese pentacarbonyl, and p-nitrosobenzyl manganese pentacarbonyl are carbonylated in the above manner, the compounds p-phenoxybenzoyl manganese pentecarbonyl, 2,4,5-trichlorophenoxyacetyl manganese pentacarbonyl and p-nitrosophenylacetyl manganese pentacarbonyl are obtained.

The above described process has also been extended to carbonylation of alkyl, aralkyl and aryl molybdenum and iron carbonyl compounds. The extension of the process is illustrated by the following examples in which all parts and percentages are by weight unless otherwise indicated.

*Example XV*

A solution of 2.60 parts of cyclopentadienyl methyl molybdenum tricarbonyl in 357 parts of diethyl ether was pressurized with carbon monoxide to 3000 p.s.i.g. at 125° C. for two hours. Some decomposition occurred and the solution was filtered on discharge from the autoclave. The infrared spectrum of the ether solution showed the presence of a ketonic carbonyl and indicated the presence of cyclopentadienyl acetyl molybdenum tricarbonyl.

*Example XVI*

A solution containing 1.92 parts of cyclopentadienyl methyl iron dicarbonyl in 357 parts of ether was subjected to 3000 p.s.i.g. of carbon monoxide pressure at 125° C. for two hours. After discharging the autoclave, the solvent was removed under reduced pressure and the residue sublimed between 25–40° C. at one millimeter. The sublimate proved to be a mixture of starting material and carbonylated product. Pure cyclopentadienyl acetyl iron dicarbonyl was obtained by dissolving the sublimate in a minimum of N,N-dimethyl formamide and adding small amounts of water. Since a clear separation was not possible by this method, the yield of 0.43 part represents only an approximate and minimum value. The melting point was 57–58° C. The infrared spectrum of this material shows it to be cyclopentadienyl acetyl iron dicarbonyl.

The acyl manganese pentacarbonyl compounds of this invention are useful as catalysts in what is known as the oxo synthesis of aldehydes and alcohols. An embodiment of the oxo synthesis consists of treating an olefinic hydrocarbon with hydrogen and carbon monoxide under pressure in the presence of a catalyst. When an acyl manganese pentacarbonyl compound is used as the catalyst in this reaction, excellent yields of oxo synthesis products are obtained as illustrated by the following example.

*Example XVII*

The apparatus consists of a pressure vessel equipped with means for agitation and means for heating and cooling. The vessel is also equipped with openings for introduction of gases, liquids and solids.

In this vessel is placed 500 parts of hexane and five parts of acetyl manganese pentacarbonyl. Five-hundred pounds of ethylene pressure are imposed on this mixture and then the reactor is further pressured with 970 p.s.i. of a 1:1 mixture of carbon monoxide and hydrogen (synthesis gas). The reactor is heated with agitation at a temperature of 75° C. for one hour while maintaining the total pressure at 1470 p.s.i. At the end of this time, the reaction mixture is cooled and vented to the atmosphere through a Dry Ice trap. In the trap are collected a mixture of products consisting of propionaldehyde and n-propyl alcohol. A good yield of these materials is obtained.

Other organo manganese pentacarbonyl compounds are equally as useful as catalysts in the oxo synthesis. Thus, the formylation of ethylene with carbon monoxide and hydrogen using acetyl manganese pentacarbonyl in a concentration corresponding to about one-tenth percent of the ethylene gives an excellent yield of propionaldehyde. The above reaction is merely illustrative of the use of an organo manganese pentacarbonyl compound as an oxo synthesis catalyst.

The compounds of this invention are also useful as chemical intermediates. For example, bromination of the acetyl compound gave acetyl bromide in addition to bromo manganese pentacarbonyl which is also obtained by direct bromination of manganese pentacarbonyl.

The acyl manganese pentacarbonyl compounds of this invention are effective antiknock agents when added to gasoline used in the operation of spark ignition internal combustion engines. Fuels containing these compounds are tested by the procedure defined in Procedure D–908–55 of the American Society for Testing Materials. This procedure is known as the research method and is more fully described in the 1956 edition of "ASTM Manual of Engine Test Methods." When tested in this manner, 0.25 gram of manganese per gallon as perfluoroacetyl manganese pentacarbonyl raised the research octane number of a commercial gasoline from 98.7 to 99.4. One gram of this material for each gallon of gasoline raised the research octane number to 101.0. 0.5 and 1.0-gram quantities of manganese per gallon as acetyl manganese pentacarbonyl raised the research octane number of a commercial gasoline from 91.8 to 94.0 and 95.5 octane numbers respectively.

A further example of the antiknock effectiveness of our novel compounds is illustrated by propionyl manganese pentacarbonyl. 0.28 gram of manganese as propionyl manganese pentacarbonyl per gallon of a commercial fuel raised its research octane number from 91.8 to 94.5. 0.56 gram of manganese per gallon as the propionyl compound raised the research octane number to 95.2.

Having fully described our invention, we intend that it be limited only within the spirit and scope of the following claims.

We claim:
1. A compound having the formula $R(CO)Mn(CO)_5$ wherein "R" is a univalent organic group selected from the class consisting of hydrocarbon groups and substituted hydrocarbon groups in which the substituents are selected from the class consisting of halogen, alkoxy, aryloxy, carbethoxy, carbamide, thioether, nitro, nitroso and hydroxy substituents.

2. The compound of claim 1 wherein "R" contains from one to about 17 carbon atoms.

3. Benzoyl manganese pentacarbonyl.

4. Acetyl manganese pentacarbonyl.

5. Propionyl manganese pentacarbonyl.

6. Isobutyryl manganese pentacarbonyl.

7. Perfluoroacetyl manganese pentacarbonyl.

8. Phenylacetyl manganese pentacarbonyl.

9. Acrylyl manganese pentacarbonyl.

10. A process for preparing an acyl manganese pentacarbonyl compound having the formula $R(CO)Mn(CO)_5$ wherein "R" is a univalent organic group selected from the class consisting of hydrocarbon groups and substituted hydrocarbon groups in which the substituents are selected from the class consisting of halogen, alkoxy, aryloxy, carbethoxy, carbamide, thioether, nitro, nitroso and hydroxy substituents, said method comprising reacting an alkali metal manganese pentacarbonyl compound with an acylating agent that acylates by introducing the above "R(CO)" group.

11. The process of claim 10 wherein said "R" group contains from one to about 17 carbon atoms.

12. The process for forming an acyl manganese pentacarbonyl compound having the formula $R(CO)Mn(CO)_5$ wherein "R" is a univalent organic group selected from the class consisting of hydrocarbon groups and substituted hydrocarbon groups in which the substituents are selected from the class consisting of halogen, alkoxy, aryloxy, carbethoxy, carbamide, thioether, nitro, nitroso and hydroxy substituents, said method comprising reacting carbon monoxide with a compound having the formula $RMn(CO)_5$.

13. The process of claim 12 wherein said "R" group contains from one to about 17 carbon atoms.

14. The compounds of claim 2 wherein the molecular weight of the compound $R(CO)Mn(CO)_5$ ranges up to about 450.

15. The process of claim 11 wherein the molecular weight of the compound $R(CO)Mn(CO)_5$ ranges up to about 450.

16. The process of claim 15 wherein the reaction is carried out in the presence of a saturated organic ether solvent.

17. The process of claim 16 wherein the ether solvent is a cyclic ether.

18. The process of claim 17 wherein the ether solvent is tetrahydrofuran.

19. The process of claim 17 wherein the ether solvent is dioxane.

No references cited.